(12) United States Patent
Li et al.

(10) Patent No.: US 9,721,185 B2
(45) Date of Patent: Aug. 1, 2017

(54) AUTOMATIC DETECTION OF LOGOS IN VIDEO SEQUENCES

(71) Applicant: ARRIS Enterprises, Inc., Suwanee, GA (US)

(72) Inventors: Renxiang Li, Lake Zurich, IL (US); Faisal Ishtiaq, Chicago, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 81 days.

(21) Appl. No.: 14/595,608

(22) Filed: Jan. 13, 2015

(65) Prior Publication Data

US 2016/0203388 A1    Jul. 14, 2016

(51) Int. Cl.
| | |
|---|---|
| *H04H 60/32* | (2008.01) |
| *H04N 7/173* | (2011.01) |
| *G06K 9/62* | (2006.01) |
| *H04N 19/136* | (2014.01) |
| *G06K 9/46* | (2006.01) |
| *G11B 27/036* | (2006.01) |
| *G11B 27/34* | (2006.01) |
| *G06K 9/00* | (2006.01) |
| *G06T 7/73* | (2017.01) |
| *G06T 7/13* | (2017.01) |

(52) U.S. Cl.
CPC ....... *G06K 9/6201* (2013.01); *G06K 9/00771* (2013.01); *G06K 9/4604* (2013.01); *G06T 7/13* (2017.01); *G06T 7/73* (2017.01); *G11B 27/036* (2013.01); *G11B 27/34* (2013.01); *H04N 19/136* (2014.11)

(58) Field of Classification Search
None
See application file for complete search history.

(56) References Cited

U.S. PATENT DOCUMENTS

| | | | |
|---|---|---|---|
| 6,665,873 B1 * | 12/2003 | Van Gestel | H04N 7/17354 348/461 |
| 8,175,413 B1 | 5/2012 | Ioffe et al. | |
| 2005/0078222 A1 | 4/2005 | Liu et al. | |
| 2005/0078223 A1 * | 4/2005 | Liu | G06K 9/325 348/701 |

(Continued)

FOREIGN PATENT DOCUMENTS

| | | |
|---|---|---|
| EP | 2259207 B1 | 10/2012 |
| EP | 2709038 A1 | 3/2014 |

OTHER PUBLICATIONS

N. Özay, et al. "Automatic TV Logo Detection and Classification in Broadcast Videos"; 17th European Signal Processing Conference (EUSIPCO 2009); Aug. 24-28, 2009, pp. 839-843.

(Continued)

*Primary Examiner* — William J Kim
(74) *Attorney, Agent, or Firm* — Stewart M. Wiener

(57) ABSTRACT

Particular embodiments automatically identify and track a logo that appears in video content. For example, particular embodiments can track a branding logo's position and size without any prior knowledge about the logo, such as the position, type, structure, and content of the logo. In one embodiment, a heat map is used that accumulates a frequency of short-term logos that are detected in the video content. The heat map is then used to identify a branding logo in the video content.

20 Claims, 9 Drawing Sheets

(56) References Cited

U.S. PATENT DOCUMENTS

| | | | |
|---|---|---|---|
| 2006/0111968 A1* | 5/2006 | Cline, Jr. | G06Q 30/02 |
| | | | 705/14.69 |
| 2006/0174261 A1* | 8/2006 | Cline, Jr. | G06Q 30/02 |
| | | | 725/20 |
| 2006/0182311 A1* | 8/2006 | Lev | G06K 9/325 |
| | | | 382/103 |
| 2007/0052854 A1 | 3/2007 | Yeh et al. | |
| 2009/0324088 A1* | 12/2009 | Chamaret | G06K 9/3241 |
| | | | 382/195 |
| 2010/0260426 A1* | 10/2010 | Huang | G06F 17/30247 |
| | | | 382/218 |
| 2011/0038546 A1 | 2/2011 | Langelaar | |
| 2012/0177249 A1 | 7/2012 | Levy et al. | |
| 2014/0079321 A1* | 3/2014 | Huynh-Thu | G06K 9/00711 |
| | | | 382/203 |
| 2014/0146071 A1* | 5/2014 | Kim | G09G 3/3225 |
| | | | 345/589 |
| 2014/0270504 A1 | 9/2014 | Baum et al. | |
| 2014/0270505 A1* | 9/2014 | McCarthy | H04N 19/17 |
| | | | 382/165 |
| 2014/0282671 A1* | 9/2014 | McMillan | H04N 21/8352 |
| | | | 725/19 |
| 2015/0058877 A1* | 2/2015 | Lakkundi | H04N 21/439 |
| | | | 725/19 |
| 2015/0206169 A1* | 7/2015 | Ye | G06Q 30/0242 |
| | | | 705/14.41 |

OTHER PUBLICATIONS

PCT Search Report & Written Opinion, RE: Application No. PCT/UA2016/013287, dated Apr. 6, 2016.

\* cited by examiner

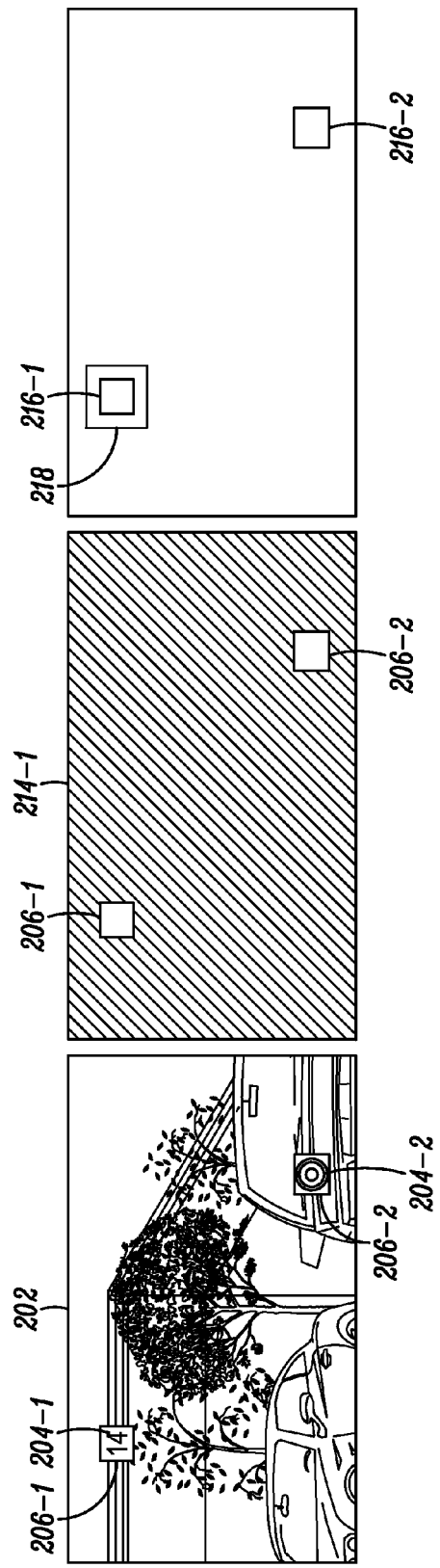

AUTOMATIC DETECTION OF LOGOS IN VIDEO SEQUENCES

BACKGROUND

Video content owners typically insert a branding logo in video programs. For example, a television station logo may be included as an overlay in a television show. The content distributors want this branding logo to appear clearly in the video content. For example, an encoder can encode the section of the image including the branding logo with a higher quality, such as a higher resolution.

To encode the branding logo with a higher quality, the encoder needs to identify where the branding logo is located in the video content, and also in what frames. In one example, information about when and where the branding logo will appear in the video content is provided to the encoder such that the encoder can locate the logos. This requires prior knowledge of the logos and this information may not always be available.

BRIEF DESCRIPTION OF THE DRAWINGS

FIG. 2A shows a first example of the logo detection process according to one embodiment.

DETAILED DESCRIPTION

Described herein are techniques for a logo detection system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments automatically identify and track a logo that appears in video content. For example, particular embodiments can track a branding logo's position and size without any prior knowledge about the logo, such as the position, type, structure, and content of the logo. In one embodiment, a heat map is used that accumulates a frequency of short-term logos that are detected in the video content. The heat map is then used to identify a branding logo in the video content.

Figure 1:
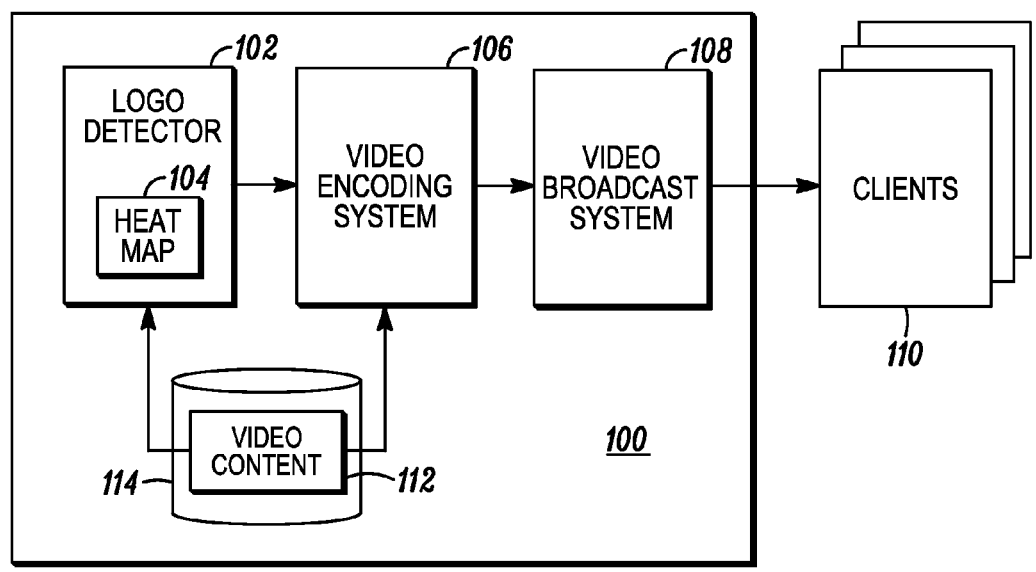
FIG. 1 depicts a system for detecting logos according to one embodiment.

FIG. 1 depicts a system 100 for detecting logos according to one embodiment. The logo may be an overlay image or graphic that is included in the video content 112 that may be stored in storage 114. Storage 114 may be any type of storage, such as read only memory (ROM), random access memory (RAM), a database, buffers, etc. The video content 112 may be received by a logo detector 102 from storage 114.

A television station may add a branding logo for the brand of the television station to a television show that is being offered to users. That is, the branding logo may identify a brand of an entity, such as a company, which may be a content owner for the video content 112 or owner of the television channel. In one embodiment, the branding logo is added to the original video content 112. In this case, the branding logo may be overlay image over the original video content 112. This creates a blended image where the logo is blended with the background of the original video content 112.

The video content 112 may include multiple logos that may be overlay images in the video content 112. Some other types of logos may be television content ratings (e.g., "TV14") or messages (#<tweet of a word>). These other logos may be a different type of logo from the branding logo. For example, typically the branding logo will appear for a longer time than the other types of logos, such as a branding logo may appear for a majority of the video program while the other types of logos may appear only briefly (e.g., a few seconds to a minute). The discussion will reference a logo or branding logo, but it will be understood that a logo may be any graphic that is included as an overlay in the video content 112. The graphic content of a logo can be completely opaque, or semi-transparent, e.g., blended into the video content 112.

The video content 112 may be video programs that are sent to users of clients 110 by a video content distributor (e.g., television station, VOD system). As is known, system 100 may be a television broadcast system that broadcasts scheduled video programs to users or video on demand system where users can request video programs on demand. Although this type of distribution is described, other video content that includes graphics overlaid in video may also be appreciated.

A logo detector 102 uses a heat map 104 to detect logos of a certain type (e.g., branding logos) in the video content 112. Heat map 104 may include accumulators that may be updated each time a short-term logo is detected in an image of the video content 112. Accumulators may keep track of a frequency value. In one embodiment, the accumulators are pixel value accumulators, e.g., each pixel of an image is associated with an accumulator. When a short-term logo is detected on a frame of video, some of the accumulators in heat map 104 may be updated, such as values for accumulators are pixels corresponding to the short-term logo are increased. These accumulators may store different frequency values as different short-term logos are detected in the multiple frames of the video content 112. As will be described in more detail below, logo detector 102 uses the accumulators to determine when a logo that appears in the video content 112 becomes a branding logo. For example, when an accumulator in heat map 104 passes a threshold, logo detector 102 may determine a logo associated with the accumulator is a branding logo and also where the branding logo is located. Logo detector 102 may detect the branding logo without any previous knowledge about the branding logo, such as the size, position, type, etc. for the detected branding logo.

Logo detector 102 may then provide logo detection information for the detected logo(s) to a video encoding system 106. The logo detection information may indicate a position and size of the logo and when the logo is detected in the video (e.g., a frame or picture number).

Video encoding system 106 also receives the video content 112 and encodes the frames of the video content 112. As described above, it may be desirable to encode a branding logo differently than the other content in a frame. For example, video encoding system 106 may use the logo detection information to determine where a logo is in the frame and encode the section where the logo is shown with a higher quality than other portions of the frame. This may make the logo clearer in the video when viewed by a user using client 110.

Video encoding system 106 may output an encoded bit stream for the video content 112 with the encoded logo encoded with a higher fidelity than other portions of the video. A video transmission system 108 may then deliver the encoded bitstream to clients 110.

Figure 2B:
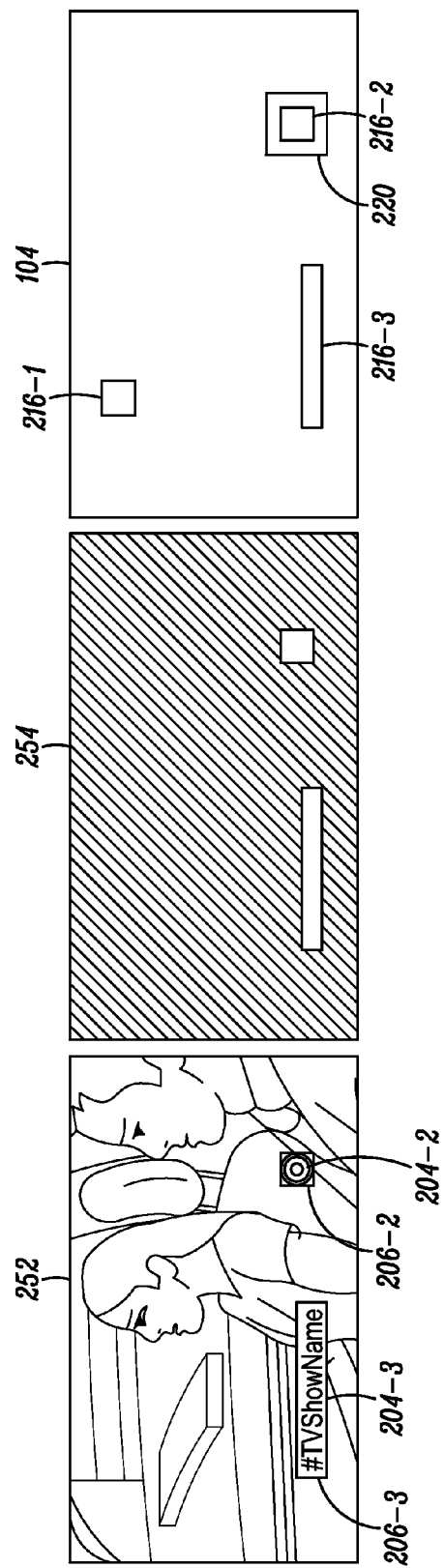
FIG. 2B shows an example of detecting logos when additional frames in the video content are analyzed according to one embodiment.

FIGS. 2A and 2B show an example of the logo detection process according to one embodiment. The processes described for FIGS. 2A and 2B are simplified to illustrate the heat map use. A more detailed example for the logo detection process will be described below.

In FIG. 2A, a current frame 202 is a frame in a video sequence of the video content 112. A frame may be a picture in the video content 112 where a series of frames or pictures is included in the video content 112 in a sequence. A person of skill in the art will appreciate the concept of a frame or picture. For discussion purposes a frame will be used, but the frame may be referred to as a picture, image, or other portion in the video content 112.

Frames may be identified by frame numbers within the video content 112. In this example, frame 202 is a frame #447 that is 15 seconds into the video content 112. Other identifiers may also be used, such as a time within the video content 112. Frame 202 may include different logos, such as a first logo 204-1 and a second logo 204-2. Logo 204-1 may be a TV14 (shown as "14" in the figures) logo that indicates an age rating for the video content 112 and logo 204-2 may be a branding logo for the television station in which the video content 112 is being transmitted.

For discussion purposes in this simplified example, it is assumed that logo detector 102 has determined first logo 204-1 and second logo 204-2 in current frame 202. Logo detector 102 may use a matching process to determine logos in current frame 202, which will be described in more detail below. As shown, the logos are surrounded by bounding boxes, which form a boundary around the logos. For example, a first bounding box 206-1 surrounds logo 204-1 and a second bounding box 206-2 surrounds logo 204-2. Particular embodiments determine the sizes and locations of the bounding boxes for the logos, and this process will also be described in more detail below.

Given the match of logos 204-1 and 204-2, particular embodiments may generate an image 214-1 with a blank background except for including bounding boxes 206-1 and 206-2 for the matched short-term logos 204-1 and 204-2. The blank background is represented by the slash marks in the figure. These boxes 206-1 and 206-2 represent the position and size of the matched short-term logos in frame 202.

As discussed above, heat map 104 has a map of accumulators that accumulates a frequency of detected short-term logos in images. Also, these accumulators are image-based and the accumulators are located where the short-term logos are detected in the frames. Also, an image-based comparison is used to determine which short-term logos match an accumulator.

Heat map 104 is an image that has the same size as the frame of the video, where each pixel is an accumulator that accumulates the pixel values from image 214-1. Image 214-1 is formulated based on detected short-term logos at the current frame. In one embodiment, image 214-1 uses the detected short-term logos at the current frame to fill in their bounding boxes 206-1 and 206-2 with a constant value (e.g., a value of "1"), and leaves the rest of the image blank, e.g., with a pixel value of "0". Then the whole image 214 is accumulated to the heat map 104, where each pixel is an accumulator. In this case, pixels in image 214-1 that are 0 do not increase the accumulators in heat map 104, but pixels with the value of 1 do. In heat map 104, accumulators shown at 216-1 and 216-2 have had their values increased. Other methods of accumulating the values may also be appreciated, such as certain areas in heat map 104 may have accumulator values increased for each bounding box 206 found in image 214-1.

The accumulators may accumulate when short-term logos are detected in frames. In one embodiment, heat map 104 is an image that has the same size as the video frame and where each pixel is an accumulator that accumulates each time a pixel in heat map 104 co-locates with a pixel in bounding box 206. Although not shown in different colors, it can be seen that accumulators in 216-1 are darker than accumulators in 216-2. In this case, this indicates that the heat value of accumulators in 216-1 is higher than the heat value of accumulators in 216-2. The higher heat value means that a short-term logo has been detected in the area of accumulators in 216-1 more frequently in frames than a short-term logo in the position where accumulators in 216-2 are located.

When image 214-1 is generated, in one embodiment, the bounding boxes 206-1 and 206-2 are compared with heat map 104 and accumulators are incremented in co-located pixels on heat map 104. If bounding boxes 206-1 and/or 206-2 overlap with accumulators at 216-1 and/or 216-2, respectively, by a predetermined overlap threshold, then heat map 104 may update the heat value or frequency associated with that respective accumulator, such as by increasing the heat value. For example, if 90% of a bounding box overlaps with an accumulator, logo detector 102 determines a match. In another embodiment, heat map 104 accumulates the pixel values at image 214-1 pixel-by-pixel.

Logo detector 102 may also determine whether a set of accumulators is associated with a type of logo, such as a branding logo. For example, a set of accumulators with a heat value that is over a threshold, logo detector 102 may determine the accumulators are associated with a special type of logo, such as a branding logo. The branding logo is expected to be a logo that is shown most frequently in the video content 112. Accumulators at 216-1 have been marked as a branding logo shown by a box 218 just for illustrative purposes. In this case, the logo "TV14" is marked as a branding logo.

As mentioned above, logo detector 102 determines logos without previous knowledge of where logos are positioned and included in the video content 112. In the above case, TV14 may not be a branding logo, but is the television content rating. Most often, branding logos are present in the majority of frames in the video content 112 while other logos may only appear briefly. Without having prior knowledge of where branding logos are, particular embodiments may need to review multiple frames to definitively determine the branding logo and may determine other logos as branding logos at some point. However, once enough frames are analyzed, particular embodiments may correctly identify the branding logo.

FIG. 2B shows an example of detecting logos when additional frames in the video content 112 are analyzed according to one embodiment. A frame 252 is a current frame being processed. Frame 252 may be a frame #1275 that may be 43 seconds into the video content 112. Two logos 204-3 and 204-2 are included in current frame 252. Logo 204-2 is the same logo found in FIG. 2A. However, a new logo 204-3 has been detected as a short-term logo. Logo 204-3 is transitional text of "#TVShowName" that is included in the video content 112 for a short time, but is not a branding logo. Also, logo 204-1 is not included in current frame 252. In this case, the TV14 logo has been removed by the content owner since it is usually only displayed in the beginning of the video content 112.

For discussion purposes, it is assumed the short-term logos detected are short-term logos 204-2 and 204-3. Logo detector 102 determines bounding boxes 206-2 and 206-3 that form a boundary around short-term logos 204-2 and 204-3, respectively. These bounding boxes are shown in an image 254 and also used for heat map accumulation. For example, heat map 104 is shown with accumulators at 216-1, 216-2, and 216-3. Accumulators at 216-1 are still included in heat map 104 even though logo 204-1 no longer appears in the frame. Also, accumulators at 216-3 are found in the same location as bounding box 206-3. The heat value for accumulators at 216-3 is low because the short-term logo just appeared in the video content 112. Due to bounding box 206-2 continuing to be included in frames of the video, the heat value of accumulators at 216-2 has increased by virtue of the frequency of detecting logo 204-2, and the heat value for accumulators at 216-2 has passed the heat value of accumulators at 216-1. In this case, logo detector 102 determines that accumulators at 216-2 are associated with a branding logo as shown at 220 due to the higher heat value being over a threshold.

In the above process depicted in FIGS. 2A and 2B, it shows that the process of capturing the logo size and position can be performed without prior knowledge. In the above process, a first logo TV14 is detected as the branding logo in the beginning, but a correct determination of the television branding logo is detected after reviewing further frames. Also, the process also eliminated short-term logos that appeared in the video content 112 from time to time, such as the TV Show Name and the TV14 logos.

Figure 3:
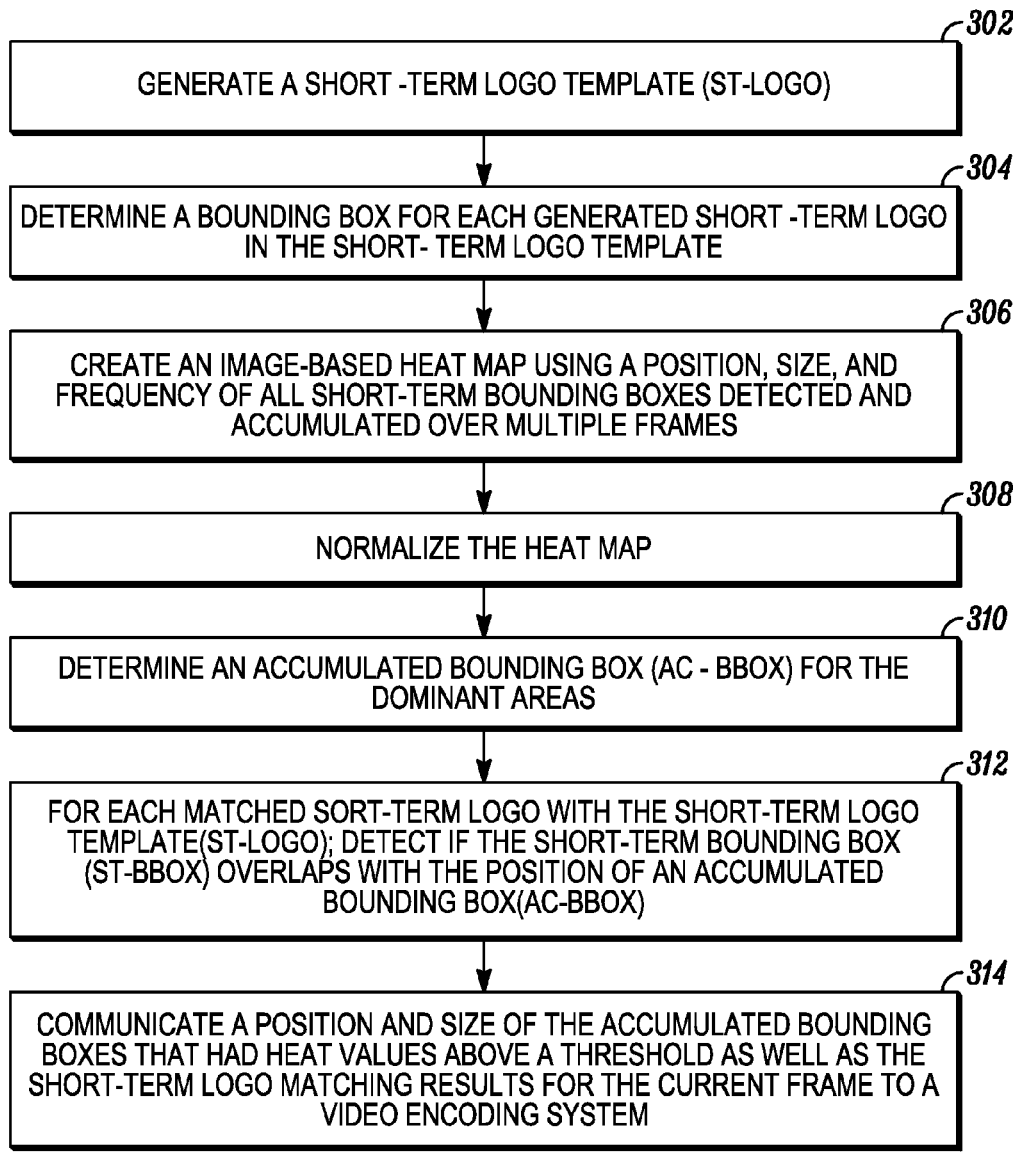
FIG. 3 depicts a simplified flowchart of a method for performing logo detection according to one embodiment.

The process of determining the branding logos will be described in more detail now. FIG. 3 depicts a simplified flowchart 300 of a method for performing logo detection according to one embodiment. At 302, logo detector 102 generates a short-term logo template (ST-Logo). In one embodiment, techniques for determining the short-term logo template are described in U.S. patent application Ser. No. 13/862,318, entitled "Logo Presence Detection Based on Blending Characteristics", filed Apr. 12, 2013, which claims priority to U.S. Provisional Application No. 61/799,196, filed on Mar. 15, 2013 (hereinafter "The '318 Application"), which is incorporated by reference in its entirety for all purposes. The '318 Application describes an alpha blending model that generated a logo mask identifying where pixels in the logo should be indicated. In this case, a blended transition detector responds to edges that are consistent with a transition from non-blended pixels to blended pixels. Blended pixels may be pixels in which an overlay of a logo is blended with a background of the video content 112. Non-blended pixels are where an overlay has not been blended with the background. Particular embodiments may use the alpha blending technique to detect logos. Also, other techniques that can detect logos that are overlaid on video content 112 may be used.

At 304, logo detector 102 determines a bounding box for each generated short-term logo in the short-term logo template. In this case, the bounding box may form a boundary for each logo in the short-term logo template. The '318 Application describes forming a boundary for a logo.

At 306, logo detector 102 creates an image-based heat map 104 using a position, size, and frequency of all short-term bounding boxes detected and accumulated over multiple frames. In one embodiment, the detected short-term bounding boxes are filled in with same value on a blank image (as illustrated in images 214-1 and 254), and accumulated to the accumulators at heat map 104. For example, heat map 104 may include accumulated bounding boxes (AC-BBOXes) that surround dominant areas of accumulators in heat map 104. That is, accumulators that are grouped together where prior short-term logos were detected and accumulated.

At 308, logo detector 102 normalizes heat map 104. The normalization may not be necessary. In this case, logo detector 102 normalizes values by dividing by maximum pixel values to normalize the highest accumulated value to 1. The normalization generated a separate normalized heat map and leaves the original heat map unaltered. This is just to make it easier to apply a fixed threshold, e.g., 0.8, on the normalized heat map in order to determine branding logos.

At 310, logo detector 102 determines an accumulated bounding box (AC-BBOX) for the dominant areas. The accumulated bounding box forms a boundary around the dominant areas in heat map 104 that include accumulators (e.g., pixel accumulators) that have higher values. Logo detector 102 stores the accumulated bounding boxes in a temporal buffer that indicates the position and size of each accumulated bounding box.

At 312, for a current frame 202, for each matched short-term logo with the short-term logo template (ST-Logo), logo detector 102 detects if the short-term bounding box (ST-BBOX) overlaps with the position of an accumulated bounding box (AC-BBOX) that has a heat value above a threshold. That is, logo detector 102 first determines where accumulated logos are on heat map 104 that are branding logos. Then, logo detector 102 determines if short-term bounding boxes overlap with accumulated bounding boxes as shown in FIGS. 2A and 2B.

If there is an overlap, such as an overlap tested by a certain threshold, logo detector 102 determines this short-term logo is a branding logo on the current frame. Also, logo detector 102 may store the matched short-term bounding box in a temporal buffer. Also, logo detector 102 may perform temporal filtering to the short-term bounding box that is stored in the temporal buffer to remove jitter. For example, the removal of the jitter may account for small variations in time in detection of the logo. That is, a more reliable detection of a ST-logo in a specific frame may be performed using the stored short-term bounding boxes. Since the short-term logo template is generated and updated on the fly, the ST-logo matching may be by nature noisy. If the matching result for a ST-logo is buffered in a time window, e.g., 30 frames, then by looking at the labels (0/1) at the buffer, a more robust conclusion can be made if there is a match. For example, (1) if there are only two separate 1 s at the buffer, may be they are false match; and (2) if there are all 1 s but only one 0 at a frame, may be this is a missed detection.

Particular embodiments may communicate the presence of a matched accumulated bounding box/short-term logo on the current frame to video encoding system 106 differently. In a first option, logo detector 102 may communicate when an accumulated bounding box is determined to be a logo of a certain type (e.g., a branding logo) to video encoding system 106 for each frame processed. In a second option, logo detector 102 may communicate the matching results and accumulated bounding boxes in heat map 104 to video encoding system 106, which can then analyze the information to determine how to encode the video. In one embodiment, at 314, logo detector 102 communicates a position and size of the accumulated bounding boxes that had heat values above a threshold as well as the short-term logo matching results for the current frame (e.g., a frame number) to video encoding system 106. In this case, video encoding system 106 can process the area associated with an accumulated bounding box that matched a short-term logo in a manner different from an area outside of the accumulated bounding box. For example, when a short-term logo appears for a certain number of frames such that the heat value for a respective accumulated bounding box goes above a threshold, then logo detector 102 can communicate a position and size of the accumulated bounding box to video encoding system 106 along with the frame number when the short-term logo appears on the current frame.

Figure 4:
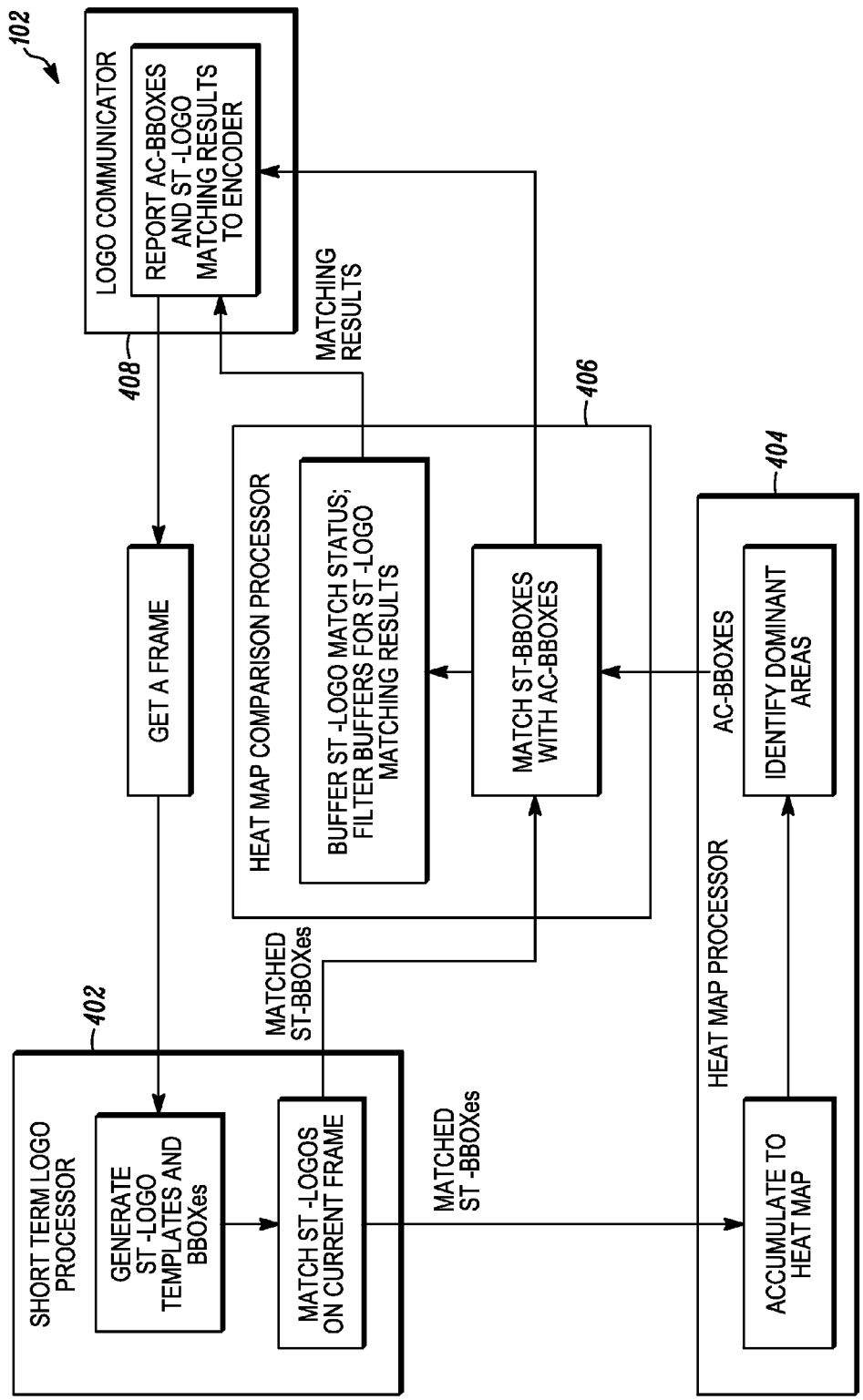
FIG. 4 shows a more detailed example of a logo detector according to one embodiment.

FIG. 4 shows a more detailed example of logo detector 102 according to one embodiment. Logo detector 102 includes various modules that implement the method of FIG. 3.

A short-term logo processor 402 generates the short-term template and also the short-term bounding boxes as described in 302 and 304 of FIG. 3. Then, short-term logo processor 402 matches the short-term logos in a current frame with the short-term logos in the template.

Once determining the matched short-term logos in the current frame, short-term logo processor 402 sends the results to a heat map processor 404 and a heat map comparison processor 406.

Heat map processor 404 accumulates the results for heat map 104 based on the matched short-term bounding boxes. The accumulation updates heat values for accumulators in accumulated bounding boxes. Then, heat map processor 404 identifies the dominant areas in heat map 104. The dominant areas may be determined based on accumulators that are above a threshold. Accumulated bounding boxes are formed with groups of accumulators. In one embodiment, grouping of accumulators includes applying morphological operations to those accumulators that pass the threshold test, eliminating isolated pixels and filling in holes, and grouping spatially connected accumulator pixels.

A heat map comparison processor 406 receives the matched short-term bounding boxes from short-term logo processor 402 and the accumulated bounding boxes that are above a threshold from heat map processor 404. Heat map comparison processor 406 then determines if the matched short-term bounding boxes match the accumulated bounding boxes. When this occurs, heat map comparison processor 406 determines that this short-term logo may be a branding logo. Also, to possibly filter match jitter, heat map comparison processor 406 stores the short-term logo match status in a buffer and used stored match results to filter the match jitters.

A logo communicator 408 receives the matching results from heat map comparison processor 406 and can report the position and size of the accumulated bounding boxes and short-term logo matching results to video encoding system 106. For example, logo communicator 408 communicates a match occurred when heat map 104 indicates there is a branding logo in the heat map that matches a short-term logo in the current frame. The process then continues again as another current frame is processed.

Alternatively, once the branding logo area is identified, and the accumulated bounding box is available, logo communicator 408 can communicate the size and position of the branding logo irrespective if there is a match for the current frame. The video encoding system 106 encodes the area differently, for example, more crisply than other areas of the frame.

Figure 5A:
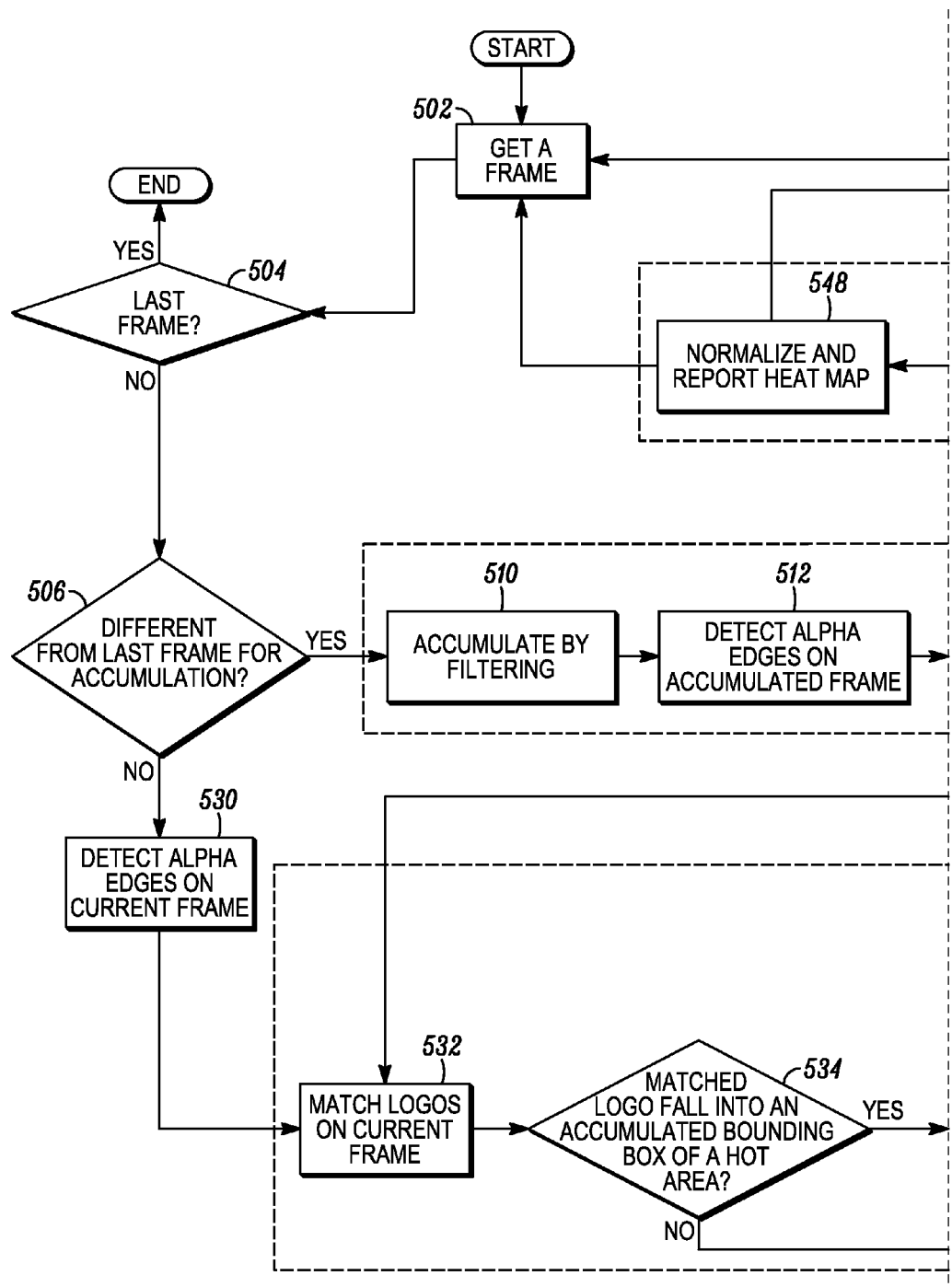
FIGS. 5A and 5B depict a more detailed flowchart of a method for performing logo detection according to one embodiment.
Figure 5B:
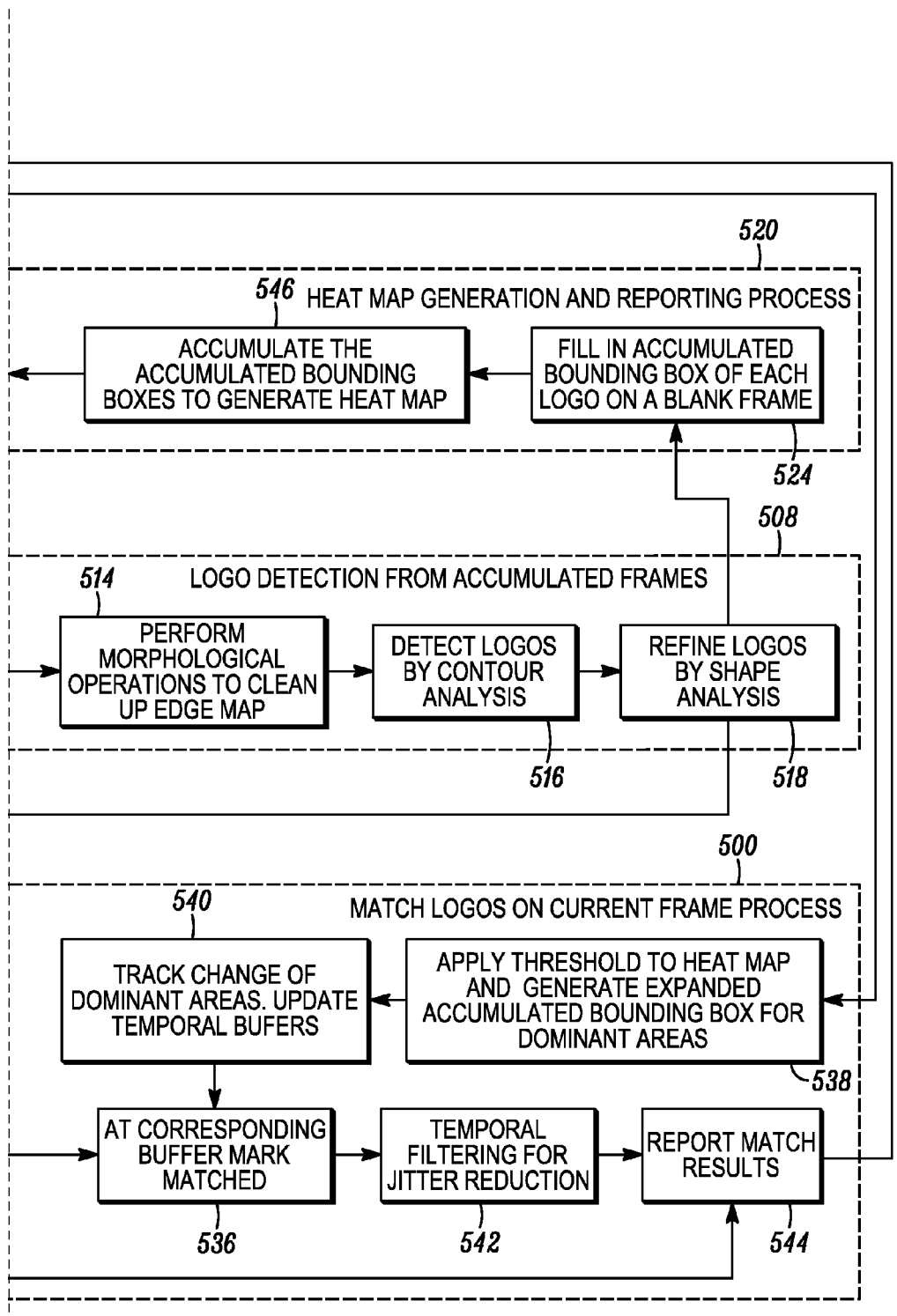

FIGS. 5A and 5B depicts a more detailed flowchart 500 of a method for performing logo detection according to one embodiment. At 502, logo detector 102 determines a current frame to process. At 504, logo detector 102 determines if this is the last frame of the video content 112. If so, the process ends. If not, at 506, logo detector 102 determines if the current frame is different from the last frame that was accumulated. The reason why logo detector 102 checks to see if the current frame is different from the last frame that was accumulated is that accumulating the same frame for the short-term logo template may accumulate entities in the frames that may not be logos. For example, if multiple frames show an object that does not move in the frames, such as a desk, then that desk may be detected as a logo because it continuously shows up in the frames. By accumulating only different frames for the template, logos that continually appear in the same location of the frames can be accurately detected as short-term logos. Most objects in the accumulated frames would move, and thus not be detected as short-term logos. That is, the accumulated image background becomes feature-less because of the different (nearly random) content accumulation, while if there is a semi-transparent or opaque logo, it will be persistent over all accumulated frames.

At 508, the process for performing logo detection from accumulated frames is described. It will be understood that other methods for detecting logos in the accumulated frames may be used. Also, additional details may be found in the '318 application. The result of the logo detection from the accumulated frames forms the short-term logo template. In the process, at 510, logo detector 102 accumulates the frame first by using filtering, such as an infinite impulse response (IIR) filter or a finite impulse response (FIR) filter. The filtering may filter pixel values at each position of the frame. Various filters for pixel values are known in the art and can be used to determine filtered pixel values. One filter may be a spatial averaging filter, which involves averaging the values of a set of neighboring pixels.

At 512, logo detector 102 detects alpha edges on the accumulated frames. Detecting the alpha edges may detect edges using an alpha-blending factor. Using the alpha-blending factor may detect blended edges where an overlay logo is situated above a background of the video content 112. Detecting alpha edges also includes the special case where the alpha-blending factor is 1.0, or equivalently, the logo is overlaid on top of the video content 112 without blending.

At 514, logo detector 102 performs morphological operations to clean up the edge map. The morphological operation may eliminate noisy edges in the edge map and fill in holes between alpha edges.

At 516, logo detector 102 detects logos by a contour analysis. In this case, the contours of the edges are analyzed to determine when edges define a logo.

At 518, logo detector 102 refines logos using a shape analysis. The shapes may be refined to form the logos. In one embodiment, each contour is analyzed in order to reject an object that is less likely to be a logo. For example, a long and thin line shape is less likely to be a logo for TV content. One way to perform this screening is to generate a bounding box for the contour, and examine its height/width ratio. Another example is to check the size of the bounding box; if the bounding box takes over a quarter of the whole frame, then it is less likely a logo.

The logo detection from the accumulated frames provides the short-term logo template. In one embodiment, the detected short-term logo template is stored as a set of detected alpha edge pixels as well as their bounding boxes (BBOX), which specifies the position and size of the logo template. In one embodiment, the bounding box is defined as the minimum bounding box for the contour at 516. After determining the short-term logo template, logo detector 102 provides the short-term logo template to a "heat map generation and reporting process" shown at 520 and a "match logos on a current frame" process shown at 522. The heat map generation and reporting process will be described first.

At 524, logo detector 102 fills in the pixels within the bounding box with a constant value on a blank frame for each short-term logo that is a match at the current frame. The filled in boundary is used for accumulating the heat value for accumulated bounding boxes in heat map 104 for each of the detected logos in the accumulated frames. At 526, logo detector 102 accumulates the accumulators, which are shown in accumulated bounding boxes, to generate heat map 104. In one embodiment, each time a short-term bounding box is encountered, the heat value for accumulators associated with the short-term bounding box are updated in heat map 104. In other embodiments, if a short-term bounding box overlaps with an accumulated bounding box, accumulators in the accumulated bounding box are incremented. At 528, logo detector 102 normalizes and outputs heat map 104.

The match logos on the current frame process at 522 will now be described. At 530, logo detector 102 detects the alpha edges on the current frame. This may perform the same alpha edge detection as performed on the accumulated frames.

Once determining the alpha edges on the current frame, at 532, logo detector 102 matches logos on the current frame with the short-term logo template received from the logo detection from accumulated frames process. In this case, alpha edges that form logos on the current frame that match with the short-term logo template are determined In one embodiment, the match is determined by comparing the alpha edge pixels on the template with the alpha edge pixels detected on the current frame. If matched number of alpha pixels over the total number of alpha pixels at the template is over a threshold, the match is confirmed. In another embodiment, for opaque logos, the match is performed by directly comparing the template pixels to the corresponding position pixels at the current frame. Any image matching criterion, e.g. minimum-square-error, can be used to determine a match. Once the match is determined, at 534, logo detector 102 determines if the matched logos on the current frame match with an accumulated bounding box of heat map 104 that is over a threshold. In one embodiment, logo detector 102 determines if the matched logo falls within a dominant area of heat map 104. In this case, the match may be determined for accumulated bounding boxes that have a heat value over a certain value. If there is no match, then the process proceeds to 544 where the match results are reported.

To perform the storing, previously at 538, logo detector 102 received heat map 104 from the heat map generation and reporting process and generated an expanded, accumulated bounding box for the dominant areas. Also, in one embodiment, a fixed threshold is applied to the normalized heat map in order to determine the logos that have normalized heat values above the threshold. For example, a threshold is T=0.8. If a pixel value is larger than T on the normalized heat map, then this pixel is determined to be a brand logo pixel. Collectively, the branding logo pixels form the branding logo area. In one embodiment, morphological operation is applied to the brand logo pixels in order to connect spatially adjacent pixels and fill in holes.

At 540, logo detector 102 tracks the changes of dominant areas and updates the temporal buffers. It shall be noted that, since the short-term logo template is generated dynamically or on the fly, and logo template matching is also error prone. In one embodiment, in order to obtain more reliable short-term logo matching, the matching result for each frame is buffered for, e.g. 30 frames, for each short-term logo. Once the temporal matching results are available, particular embodiments can apply temporal filtering to obtain more robust matching for a short-term logo. For example, if there is only one match out of 30 frames, then the match is likely to be a false positive. On the other hand, if there are 29 matches except for one frame there is no match, then it is likely to be a missed match. These examples illustrate how temporal filtering reduces jitter, hence generating more reliable short-term logo detection. Then, when there is a match, at 536, logo detector 102 stores the match in a buffer. At 542, logo detector 102 performs optional temporal filtering for jitter reduction.

At 544, logo detector 102 reports the match results. The match results are also reported if back at 534, no match was found. For example, logo detector 102 may report the short-term logos in the current frame that match the short-term logos in the template. Also, logo detector 102 may report which logos in the current frame matched accumulated bounding boxes in heat map 104.

Figure 6A:
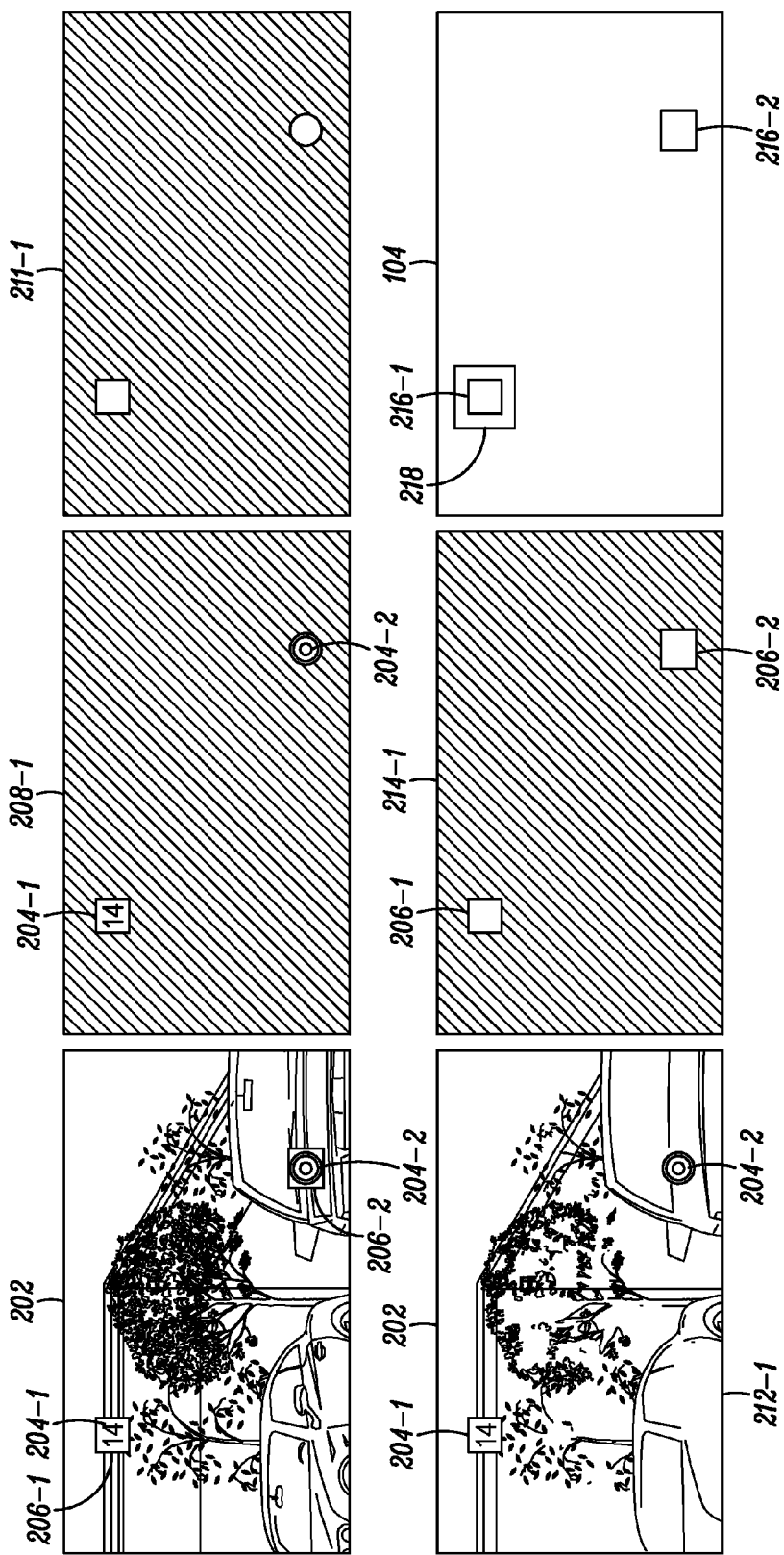
FIG. 6A shows a first example of the logo detection process according to one embodiment.
Figure 6B:
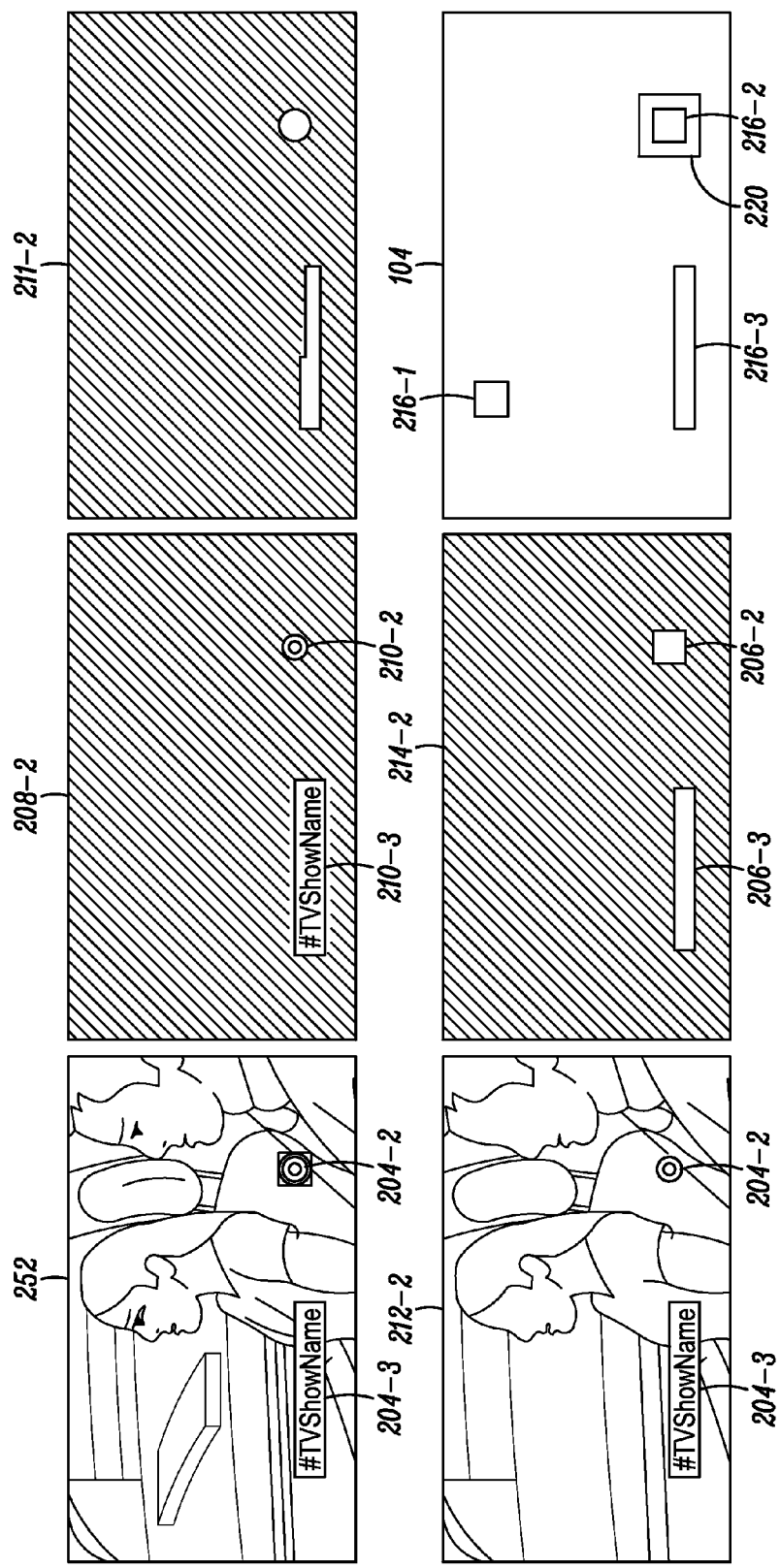
FIG. 6B shows an example of detecting logos as additional frames in the video content are analyzed according to one embodiment.

FIGS. 6A and 6B show a more detailed example of the logo detection process according to one embodiment. These frames are the same frames as shown in FIGS. 2A and 2B. However, more details in accordance with the method described in FIGS. 5A and 5B are discussed.

In FIG. 6A, frame 202 is shown again with first logo 204-1 and second logo 204-2. Particular embodiments maintain a template of short-term logos that is based on analyzing logos in a series of frames. For example, the template may accumulate information for a series of frames that have been analyzed and shows where the logos are that have been detected on the frames. The template may be maintained for a limited number of frames in the video sequence. For example, the template may accumulate short-term logos in a sliding time window around a current frame being processed, such as within a one-minute time range or a certain number of frames. A template 208-1 is shown that includes short-term logos 204-1 and 204-2. Short-term logos 204 are the result of determining short-term logos on multiple frames, such as the frames before current frame 202. As can be seen, the rough outline of logos 204-1 and 204-2 are included in template 208-1.

A morphological or filtering operation may be performed on template 208-1 and is shown in an image 211-1. As an example and without limitation, morphological operations, such as a closing operation followed by an opening operation, can be applied to the frame to eliminate noise and fill-in regions, and the presence of such a filled-in region after morphological processing may indicate the presence of a logo or other graphics objects. Image 211-1 may define the boundaries of logos 204 in template 208.

To detect whether current frame 202 includes any short-term logos that match the logos 204 in template 208-1, an edge detection on current frame 202 is performed and shown at 212-1. In one embodiment, an alpha edge detection is performed that detects edges in frame 202. The alpha edge detection may use an alpha blending parameter that may be used to detect a background pixel obscured by an overlay logo. A comparison between the alpha edge representation in template 208-1 and the alpha edge representation at 212-1 is performed to determine if current frame 202 includes any short-term logos that match logos 210-1 in template 208-1. In this case, logo 204-1 and logo 204-2 in 212-1 match logos 204-1 and logo 204-2 in 208-1, respectively.

Given the match of logos 204-1 and 204-2, particular embodiments generate an image 214-1 that includes bounding boxes 206-1 and 206-2 for the matched short-term logos 204-1 and 204-2. These boxes 206-1 and 206-2 form a boundary around the short-term logos in frame 202.

As discussed above, heat map 104 has a map of pixel accumulators that have the same size as the frame, and accumulates a frequency of detecting short-term logos in images. Heat map 104 includes accumulators at 216-1 and 216-2 as was described in FIG. 2A. When image 214-1 is generated, the bounding boxes 206-1 and 206-2 are compared with accumulators at 216-1 and 216-2 on heat map 104. If bounding boxes 206-1 and/or 206-2 overlap with accumulators at 216-1 and/or 216-2, respectively, then heat map 104 may increase the heat or frequency associated with that accumulator. In another embodiment, the pixel values of 214-1 are added to the corresponding pixels values at the heat map 104.

Logo detector 102 may also marks accumulator at 216-1 as a branding logo shown by a box 218. In this case, the logo "TV14" is marked as a branding logo.

FIG. 6B shows an example of detecting logos as additional frames in the video content 112 are analyzed according to one embodiment. A frame 252 is a current frame being processed. Frame 252 may be a frame #1275 that may be 43 seconds into the video content 112 as described in FIG. 2B. Two logos 204-3 and 204-2 are included in current frame 252. A template 208-2 has accumulated short-term logos for a range of frames. In this case, since the TV14 logo has not been included in the recent frames, and the corresponding short-term logo has disappeared from template 208-2. However, the logos 204-2 and 204-3 are included. A morphological or filtering operation may be performed on template 208-2 and is shown in an image 211-2.

As described in FIG. 6A, an edge detection is shown in an image 212-2 and compared with template 208-2. This results in a match between logos 204-2 and 204-3 in 212-2 with logos 204-2 and 204-3 in template 208-2. In an image 214-2, bounding boxes 206-2 and 206-3 are shown that form a boundary around logos 204-2 and 204-3, respectively. These bounding boxes are then used for heat map accumulation. For example, heat map 104 is shown with accumulators at 216-1, 216-2, and 216-3. Accumulators at 216-1 are still included in heat map 104. Also, accumulators at 216-3 are associated with bounding box 206-3. Due to bounding box 206-2 continuing to be included in frames of the video, the heat value of accumulators at 216-2 have increased by virtue of the frequency of detecting logo 204-2, and the heat value for accumulators at 216-2 have passed the heat value of accumulators at 216-1. In this case, logo detector 102 determines that accumulators at 216-2 are associated with a logo as shown at 220 due to the higher heat value. Optionally, an expanded bounding box 220 instead of the original bounding box 204-2 is output for video encoding process.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
generating an image-based set of accumulators, the image-based set of accumulators indicating a frequency and a position of each of a set of short-term logos determined in a first set of frames in a video sequence of video content;
detecting whether a second frame includes a first short-term logo of the set of short-term logos, wherein the second frame is in the video sequence and is not included in the first set of frames;
based on a result of the detecting, determining whether a position of the first short-term logo for the second frame corresponds to a matching position indicated in the image-based set of accumulators;
based on a result of the detecting, determining whether a frequency of the first short-term logo in the image-based set of accumulators is above a threshold; and
if the frequency of the first short-term logo is above the threshold:
identifying the first short-term logo as a branding logo shown more frequently than others of the set of short-term logos, and
outputting information for the image-based set of accumulators based on the matching position, wherein an encoding system uses the information in an encoding process.

2. The method of claim 1, wherein:
the image-based set of accumulators comprises a first boundary, the first short-term logo for the second frame comprises a second boundary, and
determining whether the short-term logo for the second frame matches the image-based set of accumulators by comparing the first boundary to the second boundary.

3. The method of claim 2, wherein comparing the first boundary to the second boundary comprises determining when the first boundary overlaps the second boundary by an overlap threshold.

4. The method of claim 1, wherein detecting the first short-term logo for the second frame comprises:
performing a first edge detection on each of the set of short-term logos for the first set of frames;
performing a second edge detection on the second frame; and
comparing the first edge detection with the second edge detection to detect the first short-term logo for the second frame.

5. The method of claim 1, further comprising:
updating the frequency of the image-based set of accumulators based on detecting the first short-term logo in the second frame.

6. The method of claim 1, wherein outputting the information comprises outputting the matching position in the image-based set of accumulators to the encoding system along with a frame identifier for the second frame.

7. The method of claim 1, wherein outputting the information comprises outputting a size of the image-based set of accumulators.

8. The method of claim 1, wherein the encoding system uses the information to encode the matching position in the image-based set of accumulators differently from video information at a different position in the second frame.

9. The method of claim 1, wherein detecting the first short-term logo for the second frame comprises:
determining a short-term logo template including a first set of short-term logos detected in the video sequence: and
comparing the second frame to the first set of short-term logos in the short-term logo template to detect the first short-term logo in the second frame.

10. A non-transitory computer-readable storage medium comprising instructions that, when executed, control the one or more computer processors to be configured for:
generating an image-based set of accumulators, the image-based set of accumulators indicating a frequency and a position of each of a set of short-term logos determined in a first set of frames in a video sequence of video content;
detecting whether a second frame includes a first short-term logo of the set of short-term logos, wherein the second frame is in the video sequence and is not included in the first set of frames;
based on a result of the detecting, determining whether a position of the first short-term logo for the second frame corresponds to a matching position indicated in the image-based set of accumulators; and
based on a result of the detecting, determining whether a frequency of the first short-term logo in the image-based set of accumulators is above a threshold; and
if the frequency of the first short-term logo is above the threshold:
identifying the first short-term logo as a branding logo shown more frequently than others of the set of short-term logos, and
outputting information for the image-based set of accumulators based on the matching position, wherein an encoding system uses the information in an encoding process.

11. The non-transitory computer-readable storage medium of claim 10, wherein:
the image-based set of accumulators comprises a first boundary, the first short-term logo for the second frame comprises a second boundary, and
determining whether the first short-term logo for the second frame matches the image-based set of accumulators by comparing the first boundary to the second boundary.

12. The non-transitory computer-readable storage medium of claim 10, wherein detecting the short-term logo for the second frame comprises:
performing a first edge detection on each of the set of short-term logos for the first set of frames;
performing a second edge detection on the second frame; and
comparing the first edge detection with the second edge detection to detect the first short-term logo for the second frame.

13. The non-transitory computer-readable storage medium of claim 10, further comprising:
updating the frequency of the image-based set of accumulators based on detecting the first short-term logo in the second frame.

14. The non-transitory computer-readable storage medium of claim 10, wherein outputting the information comprises outputting the matching position in the image-based set of accumulators to the encoding system along with a frame identifier for the second frame.

15. The non-transitory computer-readable storage medium of claim 10, wherein detecting the short-term logo for the second frame comprises:
determining a short-term logo template including a first set of short-term logos detected in the video sequence; and
comparing the second frame to the first set of short-term logos in the short-term logo template to detect the first short-term logo in the second frame.

16. A method comprising:
generating a map of image-based set of accumulators based on a first set of short-term logos in a first set of frames in a video sequence, each of the image-based set of accumulators indicating a frequency and a position of respective short-term logos detected in the first set of frames in the video sequence;
determining a short-term logo template including the first set of short-term logos in the first set of frames in the video sequence;
determining a current frame in the video sequence;
comparing the current frame to the first set of short-term logos in the short-term logo template to determine a second set of short-term logos in the current frame;
updating a map of image-based set of accumulators based on the second set of short-term logos;
based on a result of the comparing, determining whether a position of a first short-term logo in the first set of short-term logos corresponds to a matching position indicated in the first image-based set of accumulators; and
based on a result of the comparing, determining whether a frequency of the first short-term logo in the first image-based set of accumulators is above a threshold; and
if the frequency of the first short-term logo is above the threshold:
identifying the first short-term logo as a branding logo shown more frequently than others of the first set of short-term logos, and
outputting information for the first image-based set of accumulators in the map of image-based set of accumulators when a match occurs, wherein an encoding system uses the position of the first image-based set of accumulators in an encoding process.

17. The method of claim 16, wherein comparing the current frame to the first set of short-term logos comprises:
   performing a first edge detection on each of the first set of short-term logos for the first set of frames;
   performing a second edge detection on the current frame; and
   comparing the first edge detection with the second edge detection to detect the second set of short-term logos for the current frame.

18. The method of claim 16, wherein updating the map of image-based set of accumulators comprises:
   updating the frequency of the image-based set of accumulators at positions where the short-term logos are detected in the current frame.

19. The method of claim 16, wherein outputting the information comprises outputting the matching position in the first image-based set of accumulators to the encoding system along with a frame identifier for the current frame.

20. The method of claim 16, wherein outputting the information comprises outputting a size of the first image-based set of accumulators.

* * * * *